United States Patent
Cho et al.

(10) Patent No.: US 8,345,026 B2
(45) Date of Patent: Jan. 1, 2013

(54) DISPLAY APPARATUS

(75) Inventors: Heung-Su Cho, Asan-si (KR); Kyung Kang, Cheonan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1104 days.

(21) Appl. No.: 12/257,518

(22) Filed: Oct. 24, 2008

(65) Prior Publication Data

US 2009/0244035 A1 Oct. 1, 2009

(30) Foreign Application Priority Data

Mar. 27, 2008 (KR) .................. 10-2008-0028618

(51) Int. Cl.
*G06F 3/038* (2006.01)
(52) U.S. Cl. ........................ 345/204; 345/100
(58) Field of Classification Search ............ 345/87–100, 345/204, 211–213
See application file for complete search history.

(56) References Cited

U.S. PATENT DOCUMENTS

| | | | |
|---|---|---|---|
| 2007/0126721 A1* | 6/2007 | Kurokawa | 345/204 |
| 2007/0279355 A1* | 12/2007 | Hirata et al. | 345/87 |
| 2008/0204642 A1* | 8/2008 | Kobashi | 349/116 |

* cited by examiner

*Primary Examiner* — Kimnhung Nguyen
(74) *Attorney, Agent, or Firm* — F. Chau & Associates, LLC

(57) ABSTRACT

A display apparatus includes a display panel, a flexible printed circuit board, a first data driver, and second data driver. The display panel includes a display area in which an image is displayed in response to a data voltage and a peripheral area adjacent to the display area. The flexible printed circuit board is attached to the peripheral area and includes a plurality of flexible circuit lines. The first data driver is mounted on the flexible printed circuit board to directly receive image data through a part of the flexible circuit lines and convert the image data into the data voltage. The second data driver is mounted on the peripheral area to directly receive the image data through a remaining part of the flexible circuit lines and convert the image data into the data voltage.

20 Claims, 5 Drawing Sheets

DISPLAY APPARATUS

CROSS-REFERENCE TO RELATED APPLICATION

This application claims priority under Korean Patent Application No. 2008-28618, filed on Mar. 27, 2008, the disclosure of which is incorporated by reference in its entirety herein.

BACKGROUND

1. Technical Field

The present disclosure relates to a display apparatus, and more particularly, to a display apparatus that can reduce signal distortions and voltage drops.

2. Discussion of Related Art

A liquid crystal display displays an image using the electric and optical properties of liquid crystals. The liquid crystal display includes a liquid crystal display panel and a driving circuit. The panel includes liquid crystal cells arranged in a matrix form. The driving circuit drives the liquid crystal display panel.

The driving circuit includes a gate driving circuit that drives gate lines arranged on the liquid crystal display panel and a data driving circuit that drives data lines arranged on the liquid crystal display panel. The data driving circuit may include a plurality of driving integrated circuits (ICs).

The data driving ICs receive image signals and control signals through a timing controller positioned external to the liquid crystal display panel. The timing controller is connected to the data driving ICs by a multi-drop method. As shown in FIG. 1, according to the multi-drop method, a variety of signals output from the timing controller 3 are applied to the data driving ICs 7 through a single signal line 5.

However, in conventional liquid crystal displays that employ the multi-drop method, the length of the signal line that connects the timing controller and the data driving ICs increases as a distance between the timing controller and the data driving ICs increases, thereby causing increased resistance in the signal line.

Due to the increased resistance in the signal line, signal distortions and voltage drops occur between adjacent data driving ICs. As the number of the data driving ICs increases, the signal distortions and the voltage drops are exacerbated. As a result, vertical line patterns are visible in display areas corresponding to the data driving ICs, thereby causing deterioration in display quality of the liquid crystal display.

Thus, there is a need for a display apparatus that can reduce signal distortions and voltage drops between adjacent data driving ICs.

SUMMARY

In an exemplary embodiment of the present invention, a display apparatus includes a display panel, a flexible printed circuit board, a first data driver, and a second data driver. The display panel includes a display area in which an image is displayed in response to a data voltage and a peripheral area adjacent to the display area. The flexible printed circuit board is attached to the peripheral area and includes a plurality of flexible circuit lines. The first data driver is mounted on the flexible printed circuit board to directly receive image data through a part of the flexible circuit lines and convert the image data into the data voltage. The second data driver is mounted on the peripheral area to directly receive the image data through a remaining part of the flexible circuit lines and convert the image data into the data voltage.

In an exemplary embodiment of the present invention, a liquid crystal display includes and array substrate, an opposite substrate, a liquid crystal layer, a flexible printed circuit board, a first plurality of data driving chips, and a second plurality of data driving chips. The array substrate includes a display area to display images and a peripheral area adjacent to the display area. The display area includes a plurality of data lines and gate lines. The opposite substrate faces the array substrate. The liquid crystal layer is interposed between the array substrate and the opposite substrate. The flexible printed circuit board is mounted to the peripheral area and is configured to receive internal image data. The first plurality of data driving chips are mounted on the flexible printed circuit board, configured to convert the internal image data into data voltages, and provide the data voltages to a group of the data lines. The second plurality of data driving chips are mounted on the peripheral area, configured provide the data voltages to a different group of the data lines.

The second plurality of data driving chips may be configured to receive the internal image data from the first plurality of data driving chips. The second plurality of data driving chips may be configured to receive the internal image data from the first plurality of data driving chips through at least one unique panel line of a plurality of panel lines arranged in the peripheral area. The first plurality of data driving chips may include a first data driving chip and a second data driving chip, the second plurality of data driving chips may include third, fourth, fifth, and sixth data driving chips, and the first data driving chip may be disposed between the third and fourth data driving chips, while the second data driving chip may be disposed between the fifth and the sixth data driving chips. The flexible printed circuit board may include first and second flexible printed circuit boards, where the first data driving chip is mounted on the first flexible printed circuit board, and second data driving chip is mounted on the second flexible printed circuit board. The liquid crystal display may further include a printed circuit board attached to the first and second flexible printed circuit boards to output the image data to the first and second flexible printed circuit boards.

BRIEF DESCRIPTION OF THE DRAWINGS

Exemplary embodiments of the present invention will become readily apparent by reference to the following detailed description when considered in conjunction with the accompanying drawings wherein.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Hereinafter, exemplary embodiments of the present invention will be explained in detail with reference to the accompanying drawings. Like numbers refer to like elements throughout.

Figure 1:
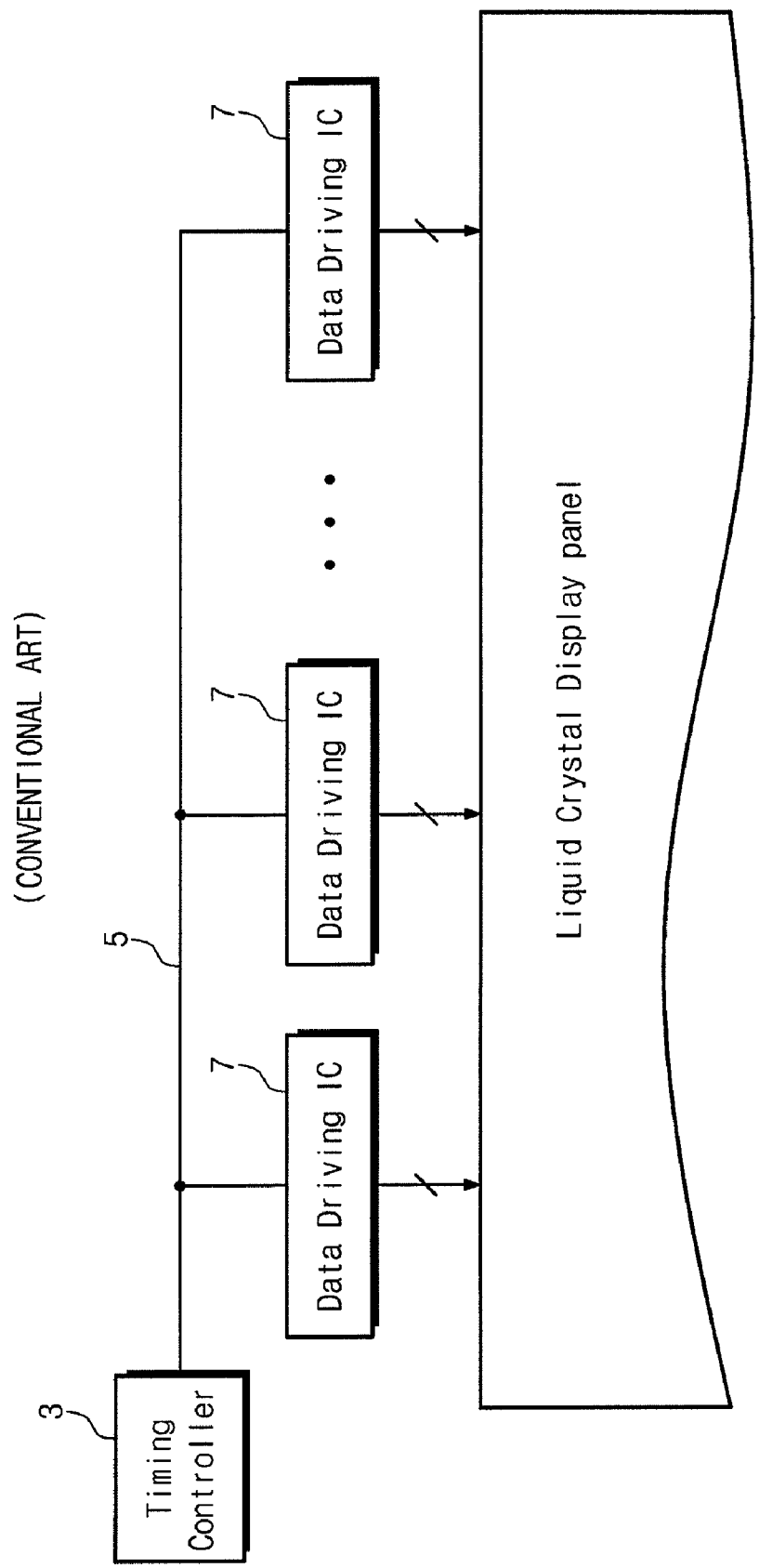
FIG. 1 is a schematic view showing a signal line connection between a timing controller and data driving ICs of a conventional liquid crystal display.
Figure 2:
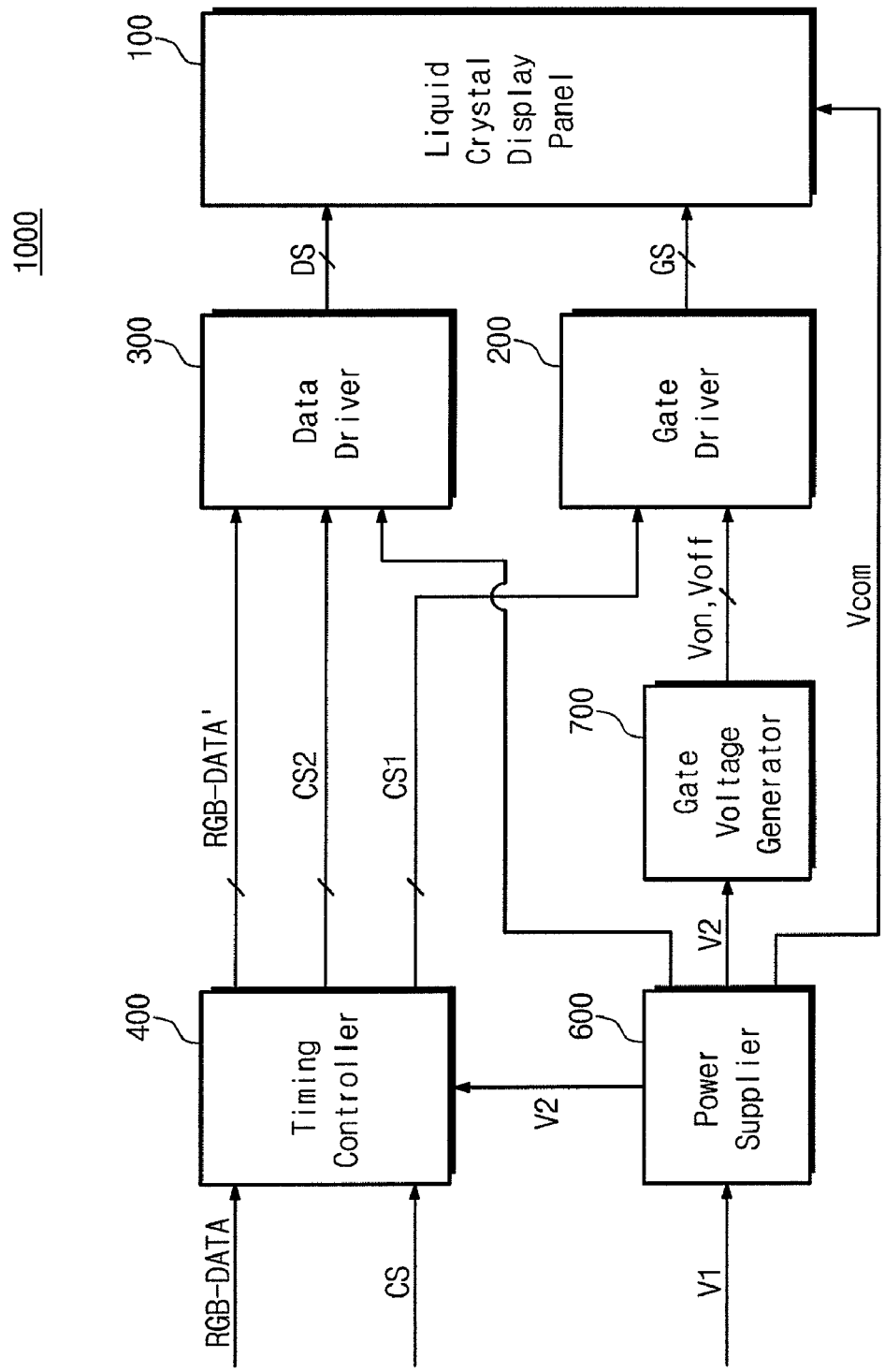
FIG. 2 is a block diagram showing a driving system of a liquid crystal display according to an exemplary embodiment of the present invention.

FIG. 2 is a block diagram showing a driving system of a liquid crystal display according to an exemplary embodiment of the present invention. Referring to FIG. 2, a driving system of a liquid crystal display 1000 includes a liquid crystal display panel 100, a gate driver 200, a data driver 300, a timing controller 400, a power supplier 600, and a gate voltage generator 700. The liquid crystal display panel 100 displays an image in response to a gate voltage GS and a data voltage DS.

The gate driver 200 applies the gate voltage GS to the liquid crystal display panel 100 in response to a gate control signal CS1, a gate-on voltage Von and a gate-off voltage Voff. The gate driver 200 outputs the gate voltage GS based on the gate control signal CS1 to allow the gate voltage GS to have either a voltage level of the gate-on voltage Von or a voltage level of the gate-off voltage Voff. The gate control signal CS1 may include a scan start signal, a gate clock signal, and an output enable signal. The gate driver 200 outputs the gate voltage GS in response to the scan start signal, and the output enable signal enables the gate voltage GS.

The data driver 300 outputs the data voltage DS in response to the data control signal CS2 and an internal image data RGB-DATA'. The data driver 300 converts the internal image data RGB-DATA' into the data voltage DS based on the data control signal CS2. The data control signal CS2 may include a horizontal start signal, a load signal, and a data clock signal. The horizontal start signal indicates the start time of the data voltage DS to data driver 300, and the load signal indicates output of the data voltage DS from the data driver 300. The data control signal CS2 may further include an inversion signal. The polarity of the data voltage DS may be inverted by the inversion signal with respect to a common voltage Vcom applied to the liquid crystal display panel 100.

The timing controller 400 may receive external image data RGB-DATA and a control signal CS from an external system such as a graphic controller. The timing controller 400 converts the external image data RGB-DATA into the internal image data RGB-DATA' in response to the control signal CS. In addition, the timing controller 400 converts the control signal CS into the first control signal CS1 and the second control signal CS2.

The power supplier 600 receives an external power voltage V1 and generates an internal power voltage V2 and the common voltage Vcom. The internal power voltage V2 is applied to the timing controller 400, the gate voltage generator 700, and the data driver 300. The gate voltage generator 700 generates the gate-on voltage Von and the gate-off voltage Voff using the internal power voltage V2.

Figure 3:
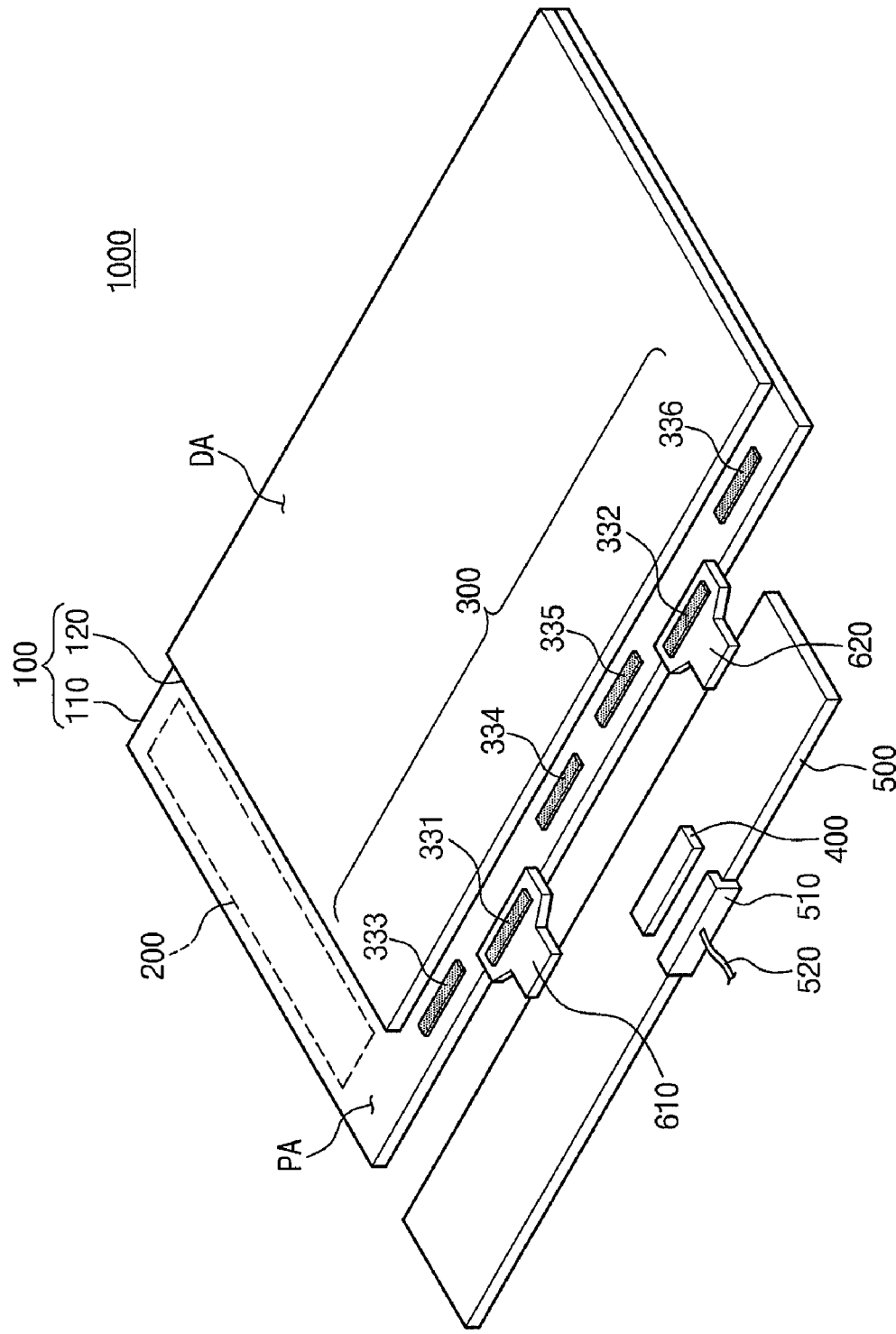
FIG. 3 is a perspective view showing a liquid crystal display according to an exemplary embodiment of the present invention.
Figure 4:
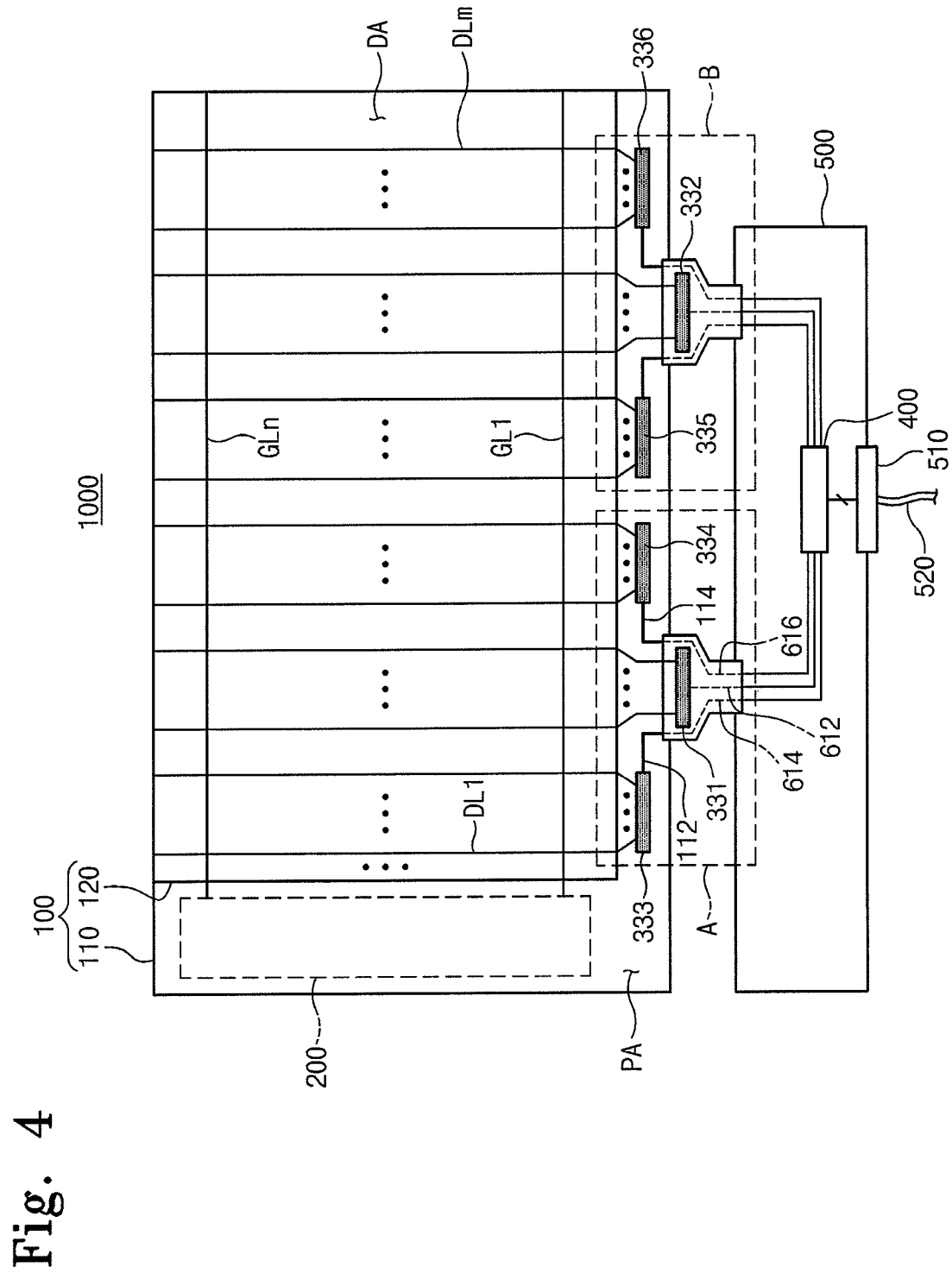
FIG. 4 is a plan view of the liquid crystal display of FIG. 3.

FIG. 3 is a perspective view showing a liquid crystal display according to an exemplary embodiment of the present invention, and FIG. 4 is a plan view showing the liquid crystal display of FIG. 3. Referring to FIGS. 3 and 4, the liquid crystal display 1000 includes the liquid crystal display panel 100 that displays the image, a printed circuit board 500 that is arranged adjacent to the liquid crystal display panel 100, first and second flexible printed circuit boards 610 and 620 that electrically connect the printed circuit board 300 to the liquid crystal display panel 100.

The liquid crystal display panel 100 includes an array substrate 110, an opposite substrate 120 facing the array substrate 110, and a liquid crystal layer (not shown) interposed between the array substrate 110 and the opposite substrate 120. The array substrate 110 includes a display area DA in which the image is displayed and a peripheral area PA adjacent to the display area DA.

Pixels are arranged in the display area DA in a matrix form, and gate lines GL1~GLn and data lines DL1~DLm are arranged in the display area DA. The gate lines GL1~GLn are insulated from and cross the data lines DL1~DLm to define pixel areas, and the pixels are arranged in the pixel areas, respectively.

Although not shown in FIGS. 3 and 4, each of the pixels includes a thin film transistor and a pixel electrode and faces a common electrode while the liquid crystal layer is interposed therebetween. Thus, when an electric field is applied to the liquid crystal layer by the pixel electrode and the common electrode, a light transmittance of the liquid crystal layer is varied by the electric field, so that the liquid crystal display panel 100 displays an image having a desired gray-scale.

The gate driver 200 and the data driver 300 are arranged on the liquid crystal display panel 100. The gate driver 200 is directly formed in the peripheral area PA of the array substrate 110 through a thin film process that is applied to form the pixels on the array substrate 110.

The gate driver 200 may include a shift register and sequentially output the gate voltage GS. The gate driver 200 may be electrically connected to respective ends of the gate lines GL1~GLn. The gate driver 200 may sequentially output the gate voltage GS to the gate lines GL1~GLn.

The data driver 300 includes a first data driver and a second data driver. The first data driver includes N data driving chips and the second data driver includes 2N data driving chips (N is a natural number). For example, when N is 2, the first data driver includes two data driving chips and the second data driver includes four data driving chips. In this example, the data driver 300 includes six data driving chips. Each of the driving chips includes a number of channels (e.g., 642 channels). Consequently, each of the data driving chips is electrically connected to a corresponding number of data lines (e.g., 642 data lines) of the data lines DL1~DLm.

The first data driver includes a first data driving chip 331 and a second driving chip 332, and the second data driver includes third, fourth, fifth and sixth data driving chips 333, 334, 335 and 336.

The first and second data driving chips 331 and 332 are mounted on the first and second flexible printed circuit boards 610 and 620, respectively, and the third to sixth data driving chips 333, 334, 335 and 336 are mounted on the peripheral area PA of the array substrate 110. For example, the first and second data driving chips 331 and 332 may be mounted on the first and second flexible printed circuit boards 610 and 620 by a chip-on-film (COF) method, respectively, and the third to sixth data driving chips 333, 334, 335 and 336 may be mounted on the peripheral area PA by a chip-on-glass (COG) method. In a conventional liquid crystal display panel, all data driving chips are mounted on the liquid crystal display panel by the COG method. However, parts of the first to sixth data driving chips 331~336 may be mounted on the flexible printed circuit boards after removing them from the array substrate 110. Thus, the total number of the data driving chips that are mounted on the array substrate 110 are reduced as compared to the conventional liquid crystal display panel, thereby reducing a manufacturing process time needed to mount the data driving chips on the array substrate 110. Consequently, a manufacturing process time for the liquid crystal display 1000 may be decreased, to thereby reduce a manufacturing cost of the liquid crystal display 1000.

The first to sixth data driving chips 331~336 are electrically connected to the data lines DL1~DLm to apply the data voltage DS to the data lines DL1~DLm.

The timing controller 400 that controls driving of the gate driver 200 and the first to sixth data driving chips 331~336 is mounted on the printed circuit board 500. Thus, the printed circuit board 500 may output the gate control signal CS1 that controls driving of the gate driver 200, the data control signal CS2 that controls driving of the first to sixth data driving chips 331~336, the internal power voltage V2 that drives the gate driver 200 and the first to sixth data driving chips 331~336, and the internal image data RGB-DATA'.

First ends of the first and second flexible printed circuit boards 610 and 620 are attached to the liquid crystal display panel 100, and second ends of the first and second flexible printed circuit boards 610 and 620 are attached to the printed circuit board 500. Accordingly, the gate control signal CS1, the data control signal CS2, the internal power voltage V2, and the internal image data RGB-DATA', which are output from the printed circuit board 500, are applied to the liquid crystal display panel 100 through the first and second flexible printed circuit boards 610 and 620.

The first flexible printed circuit board 610 transmits the data control signal CS2 that controls driving of the third and fourth data driving chips 333 and 334 of the second data driver, the internal power voltage V2, and the internal image data RGB-DATA'. The second flexible printed circuit board 620 transmits the data control signal CS2 that controls drive of the fifth and sixth data driving chips 335 and 336 of the second data driver, the internal power voltage V2, and the internal image data RGB-DATA'. Thus, the second data driver receives the data control signal CS2, the internal power voltage V2, and the internal image data RGB-DATA' through the first and second flexible printed circuit boards 610 and 620.

The first and second data driving chips 331 and 332 of the first data driver are respectively mounted on the first and second flexible printed circuit boards 610 and 620 and receive the data control signal CS2, the internal power voltage V2, and the internal image data RGB-DATA' from the printed circuit board 500.

Consequently, the first and second data driving chips 331 and 332 directly receive the data control signal CS2, the internal power voltage V2 and the internal image data RGB-DATA', and the third to sixth data driving chips 333~336 receive the data control signal CS2, the internal power voltage V2 and the internal image data RGB-DATA' through the first and second printed circuit boards 610 and 620 from the printed circuit board 500.

The first to sixth data driving chips 331~336 convert the internal image data RGB-DATA' into the data voltage DS in response to the data control signal CS, and the data voltage DS is applied to the data lines DL1~DLm.

Figure 5:
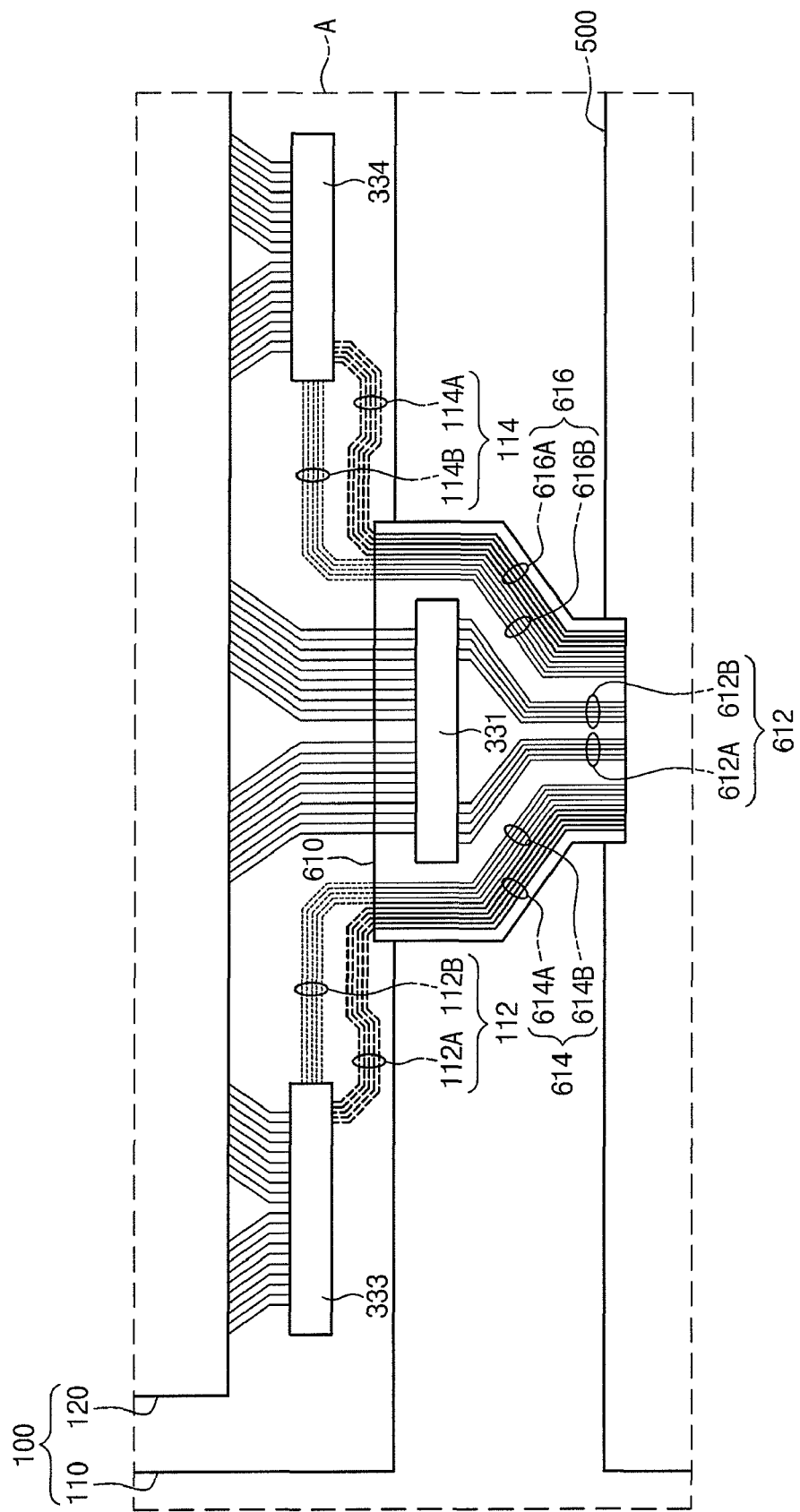
FIG. 5 is a partially enlarged view of a portion A of FIG. 4.

FIG. 5 is a partially enlarged view of a portion A of FIG. 4. For convenience of explanation, in FIG. 5, only lines for the transmission of the internal image data RGB-DATA' and lines for the transmission of the internal power voltage are shown. Thus, the lines for the transmission of the data control signal CS2 and a variety of other signals are not shown.

Referring to FIG. 5, the first flexible printed circuit board 610 includes the first data driving chip 331, a first flexible circuit line 612, a second flexible circuit line 614, and a third flexible circuit line 616, which are formed thereon.

The first data driving chip 331 is electrically connected to the first flexible circuit line 612 and receives the internal image data RGB-DATA' and the internal power voltage V2 through the first flexible circuit line 612.

A first end of the first flexible circuit line 612 is electrically connected to the first data driving chip 331 and a second end of the first flexible circuit line 612 is electrically connected to the timing controller 400. The second end of the first flexible circuit line 612 may be electrically connected to the timing controller 400 through a substrate line (not shown in FIG. 5) arranged on the printed circuit board 500. The first flexible circuit line 612 includes a data flexible circuit line 612A that receives the internal image data RGB-DATA' from the printed circuit board 500 and a voltage flexible circuit line 612B that receives the internal power voltage V2 from the printed circuit board 500. The first data driving chip 331 may be connected to the timing controller 400 through the first flexible circuit line 612 in a point-to-point method.

The second flexible circuit line 614 is positioned at a left side of the first flexible circuit line 612 with reference to a direction in which the first flexible circuit line 612 is extended. A first end of the second flexible circuit line 614 is electrically connected to a first end of a first panel line 112 arranged on the liquid crystal display panel 100, and a second end of the second flexible circuit line 614 is connected to the timing controller 400 through the substrate line (not shown) arranged on the printed circuit board 500. The second flexible circuit line 614 includes a data flexible circuit line 614A and a voltage flexible circuit line 614B.

A second end of the first panel line 112 is electrically connected to the third data driving chip 333. The first panel line 112 includes a data panel line 112A and a voltage panel line 112B. A first end of the data panel line 112A is connected to the first end of the data flexible circuit line 614A and a second end of the data panel line 112A is connected to the third data driving chip 333. A first end of the voltage panel line 112B is connected to the first end of the voltage flexible circuit line 614B and a second end of the voltage panel line 112B is connected to the third data driving chip 333. Accordingly, the third data driving chip 333 may receive the internal image data RGB-DATA' and the internal power voltage V2 from the first printed circuit board 500. As shown in FIG. 5, the third data driving chip 333 may be connected to the timing controller 400 through the first panel line 112 and the second flexible circuit line 614 in a point-to-point method.

The third flexible circuit line 616 is positioned at a right side of the first flexible circuit line 612 with reference to the direction in which the first flexible circuit line 612 is extended. A first end of the third flexible circuit line 616 is electrically connected to a first end of a second panel line 114 arranged on the liquid crystal display panel 100, and a second end of the third flexible circuit line 616 is electrically connected to the printed circuit board 500. The third flexible circuit line 616 includes a data flexible circuit line 616A and a voltage flexible circuit line 616B. The data flexible circuit line 616A receives the internal image data RGB-DATA' from the printed circuit board 500 and the voltage flexible circuit line 616B receives the internal power voltage V2 from the printed circuit board 500.

A first end of the second panel line 114 is electrically connected to the fourth data driving chip 334. The second panel line 114 includes a data panel line 114A and a voltage panel line 114B. A first end of the data panel line 114A is connected to the first end of the data flexible circuit line 616A and a second end of the data panel line 114A is connected to the fourth data driving chip 334. A first end of the voltage panel line 114B is connected to the first end of the voltage flexible circuit line 616B and a second end of the voltage panel line 114B is connected to the fourth data driving chip 334. Thus, the fourth data driving chip 334 may receive the internal image data RGB-DATA' and the internal power voltage V2 from the printed circuit board 500. As shown in FIG. 5, the fourth data driving chip 334 may be connected to the timing controller 400 through the second panel line 114 and the third flexible circuit line 616 in a point-to-point method.

Line connection structures in which connection lines are provided between the second, fifth and sixth data driving chips 332, 335 and 336 that are arranged in the portion 'B' of FIG. 4 are substantially identical with line connection structures in which connection lines are provided between the first, third and fourth data driving chips 331, 333 and 334 that are arranged in the portion 'A' of FIG. 4. Accordingly, detailed descriptions of the line connection structures in which connection lines are provided between the second, fifth and sixth data driving chips 332, 335 and 336 are not needed.

As described above, each of the first to sixth data driving chips 331~336 may be connected to the timing controller 400 arranged on the printed circuit board 500 in a point-to-point method. Thus, signal distortions and voltage drops, which are caused by the line connection structures of the multi-drop method in which connection lines are provided between the timing controller and the data driving chips, may be prevented.

Further, parts of the data driving chips are mounted on the flexible printed circuit boards and remaining parts of the data driving chips are mounted on the liquid crystal display panel. Accordingly, the total number of the data driving chips mounted on the liquid crystal display panel is reduced, so that the process time needed to mount the data driving chips on the liquid crystal display panel is reduced, thereby reducing the manufacturing process time and the manufacturing cost.

Although exemplary embodiments of the present invention have been described, it is understood that the present invention should not be limited to these exemplary embodiments, and that various changes and modifications can be made by one ordinary skilled in the art within the spirit and scope of the present invention.

What is claimed is:

1. A display apparatus comprising:
  a display panel including a display area in which an image is displayed in response to a data voltage and a peripheral area adjacent to the display area;
  a flexible printed circuit board attached to the display panel and including a plurality of flexible circuit lines;
  a first data driver mounted on the flexible printed circuit board to directly receive image data through a part of the flexible circuit lines and convert the image data into the data voltage; and
  a second data driver mounted on the display panel to directly receive the image data through a remaining part of the flexible circuit lines and convert the image data into the data voltage,
  wherein the flexible printed circuit board is disposed between two driving chips of the second data driver and transmits the image data to the two driver chips through the remaining part of the flexible circuit lines.

2. The display apparatus of claim 1, wherein the first data driver is mounted on the flexible printed circuit board by a chip-on-film method, and the second data driver is mounted on the display panel by a chip-on-glass method.

3. The display apparatus of claim 1, wherein the first data driver comprises N data driving chips, and the second data driver comprises 2N data driving chips, wherein the N is a natural number.

4. The display apparatus of claim 3, wherein the flexible printed circuit board comprises N flexible printed circuit boards, and the first data driver mounted on the N flexible printed circuit boards, respectively.

5. The display apparatus of claim 4, further comprising a plurality of panel lines arranged in the peripheral area, and wherein the flexible printed circuit board transmits the image data to each of the data driving chips of the peripheral area through at least one unique panel line of the plurality of panel lines.

6. The display apparatus of claim 5, wherein the flexible circuit lines comprise a first flexible circuit line, a second flexible circuit line and a third flexible circuit line, the first flexible circuit line transmits the image data to the data driving chips mounted on the flexible printed circuit board, the second flexible circuit line transmits the image data to one data driving chip of two of the data driving chips of the peripheral area that are adjacent each other, and the third flexible circuit line transmits the image data to a remaining data driving chip of the two adjacent data driving chips.

7. The display apparatus of claim 6, wherein the panel lines comprise a first panel line and a second panel line, the first panel line electrically connects the second flexible circuit line and the one data driving chip of the two adjacent data driving chips, and the second panel line electrically connects the third flexible circuit line and the remaining data driving chip of the two adjacent data driving chips.

8. The display apparatus of claim 1, further comprising a printed circuit board attached to the flexible printed circuit board to output the image data to the first data driver and the second data driver.

9. The display apparatus of claim 8, further comprising a timing controller arranged on the printed circuit board to output the image data.

10. A liquid crystal display comprising:
  an array substrate including a display area to display images and a peripheral area adjacent to the display area, wherein the display area includes a plurality of data lines and gate lines;
  an opposite substrate facing the array substrate;
  a liquid crystal layer interposed between the array substrate and the opposite substrate;
  a flexible printed circuit board attached to the display panel and configured to receive internal image data;
  a first plurality of data driving chips mounted on the flexible printed circuit board and configured to convert the internal image data into data voltages and provide the data voltages to a group of the data lines; and
  a second plurality of data driving chips mounted on the display panel and configured to provide the data voltages to a different group of the data lines,
  wherein the flexible printed circuit board is disposed between two driving chips of the second data driver and transmits the image data to the two driver chips through the remaining part of the flexible circuit lines.

11. The liquid crystal display of claim 10, wherein the second plurality of data driving chips are configured to receive the internal image data from the first plurality of data driving chips.

12. The liquid crystal display of claim 11, wherein each of the second plurality of data driving chips are configured to receive the internal image data from the first plurality of data driving chips through at least one unique panel line of a plurality of panel lines arranged in the peripheral area.

13. The liquid crystal display of claim 10, wherein the first plurality of data driving chips includes a first data driving chip and a second data driving chip, the second plurality of data driving chips includes a third, fourth, fifth, and sixth data driving chip, and the first data driving chip is disposed between the third and fourth data driving chips and the second data driving chip is disposed between the fifth and the sixth data driving chips.

14. The liquid crystal display of claim 13, wherein the flexible printed circuit board comprises first and second flexible printed circuit boards, the first data driving chip is mounted on the first flexible printed circuit board, and second data driving chip is mounted on the second flexible printed circuit board.

15. The liquid crystal display of claim 14, further comprising a printed circuit board attached to the first and second flexible printed circuit boards to output the image data to the first and second flexible printed circuit boards.

16. The liquid crystal display of claim 10, wherein the data driving chips are configured to receive a power voltage.

17. The liquid crystal display of claim 10, wherein the first plurality of data driving chips are mounted on the flexible printed circuit board by a chip-on-film method.

18. The liquid crystal display of claim 10, wherein the second plurality of data driving chips are mounted on the peripheral area by a chip-on-glass method.

19. The liquid crystal display of claim 10, further comprising a timing controller configured to receive external image data and an external control signal and convert the external image data into the internal image data in response to the external control signal.

20. The liquid crystal display of claim 19, further comprising a gate driver configured to supply gate voltages to the gate lines in response to a control signal from the timing controller.

* * * * *